July 26, 1932.  G. S. VERNAM  1,868,678
TELEGRAPH REPEATER
Filed June 12, 1930
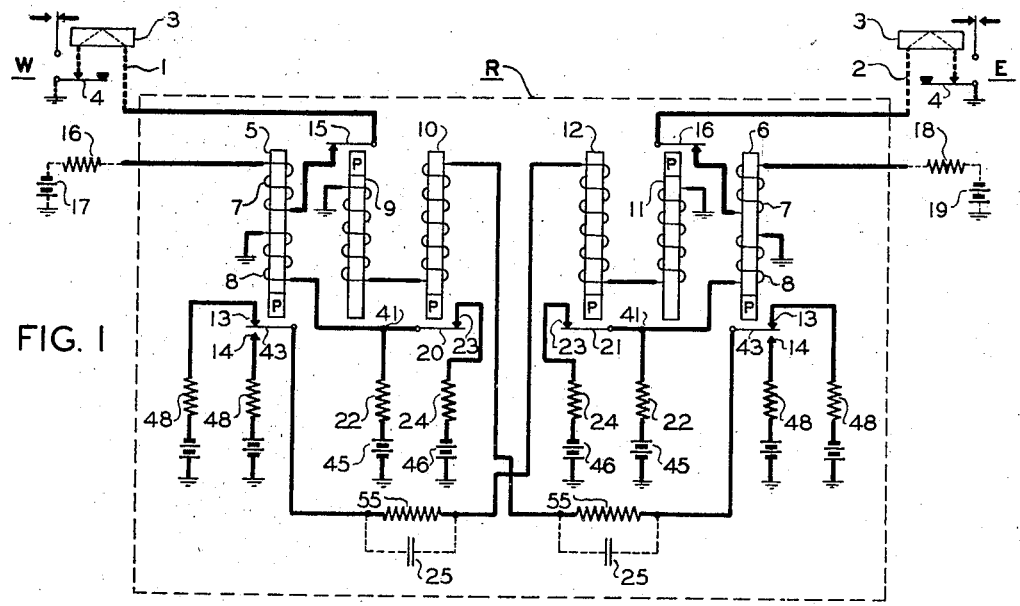
FIG. 1
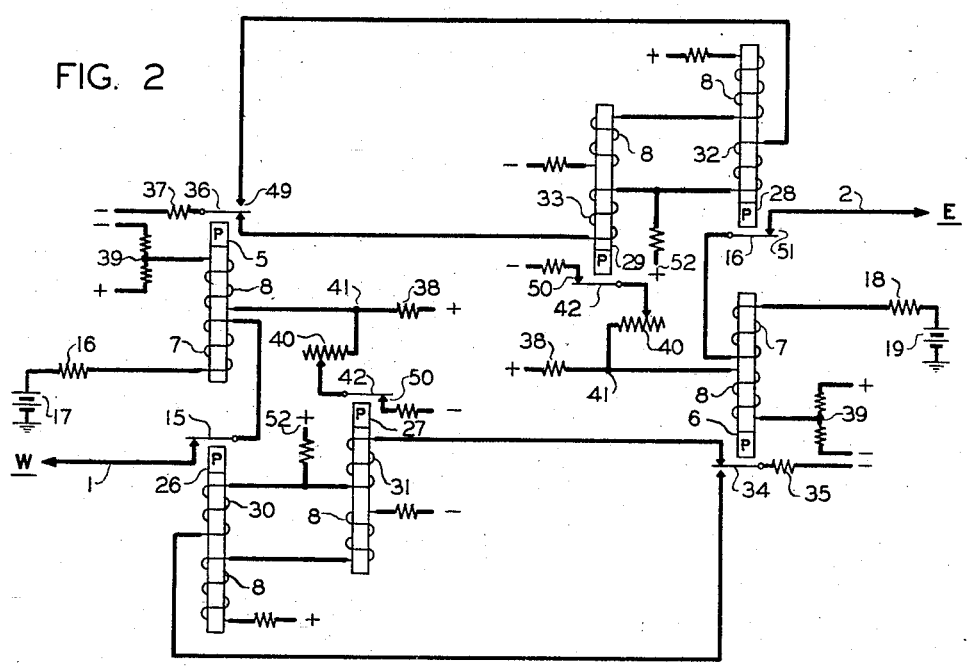
FIG. 2
INVENTOR
GILBERT S. VERNAM
BY
ATTORNEY Patented July 26, 1932

1,868,678

UNITED STATES PATENT OFFICE

GILBERT S. VERNAM, OF RIVER EDGE, NEW JERSEY, ASSIGNOR TO INTERNATIONAL COMMUNICATIONS LABORATORIES, INC.

TELEGRAPH REPEATER

Application filed June 12, 1930. Serial No. 460,637.

This invention relates to telegraph systems and more particularly to improvements in devices for repeating or re-transmitting signals over connecting lines. It is especially adapted to single line systems whether used for Morse telegraph or printing telegraph operation over distances that are too great for direct transmission from sending to receiving stations.

Among the types of repeaters heretofore used for this purpose are those employing two or more sets of relays in which various mechanical devices were resorted to for overcoming the difficulties of repeating signals rapidly over loop circuits that included a high inductance. The primary object of this invention is to render the repeating apparatus more efficient in spite of heavy line inductance and more positively and quickly responsive to signals, particularly where they are of the characteristics required in printing telegraphy.

In carrying out this invention there are provided at the repeater station six polar relays, some or all of which have plural windings. In one embodiment of this invention a three-wire power supply is used in the local circuits, consisting preferably of both positive and negative 110 volts with a grounded neutral. The grounded neutral is not essential, however, as will be seen upon reference to the modified embodiment hereinafter shown and described.

The invention may be more fully understood from the following description together with the accompanying drawing in which Figure 1 represents diagrammatically one embodiment of the invention, and Fig. 2 represents also diagrammatically a somewhat modified arrangement.

Referring to Fig. 1, two stations W and E are shown interconnected by lines 1 and 2 through the repeater set R. The terminal stations comprise sounders or other receiving instruments 3 and the grounded transmitting keys or their equivalent 4.

Relays 5 and 6 in the repeater set have line windings 7 and biasing coils 8. The windings of relay 9 and 10 are in series with each other and with the armature of relay 6. Correspondingly, the windings of relays 11 and 12 are in series with each other and with the armature of relay 5. These armatures swing between front contacts 13 which are connected to negative battery and back contacts 14 connected to positive battery.

The armature 15 of relay 9 is included in the circuit connecting line 1 through winding 7 of relay 5 and thence through a resistance 16 to grounded battery 17. Correspondingly the armature 16 of relay 11 is included in the circuit for line 2 which may be further traced through winding 7 of relay 6, resistance 18 and thence to grounded battery 19.

Coils 8 of relays 5 and 6 respectively have grounded terminals on the one hand and on the other they connect with armatures 20 and 21 respectively, and also through relatively high resistance 22 (for example 8,000 ohms) with positive battery 45. The front contacts 23 associated with armatures 20 and 21 respectively connect through relatively low resistances 24 (2700 ohms for example) with negative battery 46. The resistances 48 and 55 may be all alike if desired and preferably of about 3000 ohms each.

In some instances it is found to be advantageous to shunt two of these resistances by condensers 25.

Referring to the alternative embodiment shown in Fig. 2 only the repeater circuits are indicated therein and it will be understood that sending and receiving stations are connected with the lines 1 and 2 the same as was shown in Fig. 1.

In this embodiment the relays 5 and 6 are again shown having the line windings 7 and biasing coils 8. Biasing coils 8 are also used on the other relays 26, 27, 28 and 29. Operating coils 30, 31, 32 and 33 are provided for the four last mentioned relays respectively.

Coils 30 and 31 both connect with positive battery 52 and are alternately energized by the play of armature 34 of relay 6 between its back and front contacts, the armature 34 being supplied with negative potential through the resistance 35. Similarly, coils 32 and 33 both connect with positive battery 52 and are alternately energized by the play of armature 36 of relay 5 between its back and front contacts, this armature also being supplied with negative potential through the resistance 37. The armatures 42 of relays 27 and 29 when held against their front contacts (which are negatively polarized) produce a drop of potential through the resistances 38 so that normally current will flow from the potentiometers 39 through the windings 8 of relays 5 and 6 respectively, through resistances 40 and thence through said armatures to negative battery. Reversal of current flow in these windings 8 of relays 5 or 6 is made possible by the de-energizing of the operating windings on relays 27 or 29 as the case may be, so that with contact broken between the armature 42 and its front contact the positive potential of the circuit at the junction 41 will be raised above that of the mid-points of the potentiometers 39.

The operation of this invention is as follows:

Referring again to Fig. 1, the closed or idle position of the keys 4 is shown at both of stations E and W. Current flows from ground through the keys 4 and sounders 3 from station E through line 2, armature 16, coil 7 of relay 6, resistance 18 and battery 19 to ground; also from station W through line 1, armature 15, coil 7 of relay 5, resistance 16 and battery 17 to ground. In practice it is found preferable to use a line current of about .065 amperes which holds the relay tongues 43 against their front contacts 13 in opposition to a biasing coil current through windings 8 of about .030 amperes, the circuit for which may be traced from ground through coil 8, armature 20 or 21, front contact 23, resistance 24 and battery 46 to ground. Armatures 15 and 20 are held against their front contacts by current flowing from ground through relays 9 and 10, thence through resistance 55, armature 43 of relay 6, front contact 13 and another resistance 48 to negative battery. Symmetrical with this circuit is another through relays 11 and 12 for the purpose of holding their armatures 16 and 21 against their front contacts. Thus all the relays and sounders are held to their marking positions.

Considering the key at station W now to be opened, the sounder 3 thereat will be released and coil 7 of relay 5 will be de-energized leaving coil 8 of the same relay to act in the reverse direction and throwing armature 43 against its back contact 14. This reverses the direction of current flow in relays 12 and 11 so that their armatures 21 and 16 respectively are withdrawn from their marking contacts. The circuit through the repeater and line 2 is thereby opened so that sounder 3 at station E goes to its spacing position.

Since armatures 21 and 16 break contact at practically the same instant it is possible to hold the magnetism in relay 6 so as to prevent the movement of its armature 43 at this time. For while coil 7 is de-energizing a reversal of current flow is effected in coil 8 by the separation of armature 21 from its contact 23. The reversed current may be traced from battery 45 through resistance 22 to connection 41 and thence through coil 8 to ground. It will be remembered that resistance 22 is approximately three times as great as resistance 24, hence the predominating potential applied to connection 41 would be negative from battery 46 when armature 21 is in the marking position and positive from battery 45 when the circuit to battery 46 is opened by said armature.

It is obvious that with relay 6 held to marking while current ceases to flow through its coil 7, the circuit through the windings of relays 9 and 10 will not be disturbed, and the sending operator being at station W will maintain control of the repeater because his line circuit will not be opened by the release of relay 9.

If while the key at station W is open, the operator at station E also opens his key, no effect will be noticed at station W since line 2 is already open at armature 16. If the key at station E is held open while the key at station W is then closed, relays 5, 11 and 12 will again draw their armatures to marking and the spacing signal from station E will be repeated to station W by immediately operating relays 6, 9 and 10 to their spacing positions. Station W can then no longer transmit because its circuit through line 1 is opened by armature 15.

Obviously the operation of the repeater is similar with station E sending, it being understood that relays 6, 9 and 10 would operate in place of relays 5, 11 and 12.

Condensers 25 may be shunted across the resistances 55 to obtain quicker operation of the relays with which they are connected.

Many similarities will be observed between the two arrangements shown in Figs. 1 and 2 respectively. The principal difference lies in the fact that in Fig. 1 a double source of potential is used with a grounded neutral; whereas in the modified embodiment shown in Fig. 2 a single source of energy is indicated by the use of + and − signs at various terminals.

Potentiometers 39 are provided so that the flow of current in coils 8 may be reversed by simply opening contacts to negative battery as at armatures 42.

The operation of the embodiment shown in Fig. 2 is thus:

In the idle position with keys closed at stations E and W, all six of the repeater relays will hold their armatures against the front contacts. Assuming that the key is opened at station W, coil 7 of relay 5 will de-energize, leaving coil 8 to act alone in the opposite direction. Armature 36 then goes against its back contact 49. While it is in transit, coil 33 on relay 29 will de-energize, leaving coil 8 thereon to act alone in the opposite direction. Armature 42 of said relay will break away from its negatively connected contact 50 so that the potential of the circuit connection 41 will be raised, reversing the current flow in coil 8 of relay 6 and thus holding armature 34 against its front contact in anticipation of the de-energization of coil 7 on the same relay. When armature 36 reaches its back contact 49, coil 32 of relay 28 is energized in opposition to the biasing coil 8 thereon and actuates said relay to move armature 16 away from the line-connected contact 51. This de-energizes coil 7 of relay 6.

It will be seen that this operation opens line 2 and re-transmits a spacing signal to station E. On relay 6 the retaining force of coil 8 building up before coil 7 is de-energized insures the continuity of circuit from station W through line 1, since relay 26 cannot release so long as armature 34 on relay 6 remains on its front contact. Furthermore, relay 27 cannot release and hence the biasing circuit through coil 8 of relay 5 remains undisturbed.

It should be noted that for a spacing signal the re-transmitting relay 28 lags behind the biasing-control relay 29 and for a marking signal it precedes relay 29 so as to allow the re-transmitting line current to build up in coil 7 before the biasing current in coil 8 of relay 6 is reversed.

When the key at station W is again closed, coil 7 of relay 5 receives a marking signal of approximately double the force of the biasing coil 8; armature 36 goes to its front contact and while in transit de-energizes coil 32 of re-transmitting relay 28. The biasing coil 8 on relay 28 again acts alone to pull up the armature 16, thus restoring the closed circuit through line 2 and through coil 7 of relay 6. When armature 36 of relay 5 reaches its front contact, coil 33 of relay 29 is again energized with approximately twice the opposing biasing force in coil 8 of said relay. Hence negative potential is applied through resistance 40 to the biasing circuit at connection 41 leading to coil 8 of relay 6. The reversal of current flow in this coil at this time does not affect relay 6 because it lags behind the building up of current in line coil 7 of the same relay, this line coil having approximately twice the number of ampere turns as biasing coil 8.

When signals are to be transmitted from station E and repeated over line 1 to station W, it will be seen that relay 6 receives the signals, relay 27 reverses the biasing current in coil 8 of relay 5 to lock the latter, and relay 26 re-transmits said signals to station W. Relays 5, 28 and 29 are not operated under these conditions, although the holding power of relay 5 is alternately transferred from one of its coils to the other with each signal.

What is claimed is:

1. In a single line telegraph repeater connected to two loop circuits, a line relay in each loop circuit and responsive to incoming signals thereon, a biasing coil for each line relay, a bias-reversal relay to control each said biasing-coil, and two re-transmitting releys each of which has a contact and armature in one loop circuit and a coil responsive to the operation of the line relay which is included in the other loop circuit.

2. In a telegraph repeater comprising a plurality of relays, one of said relays having a winding included in a re-transmitting circuit, bias reversal means responsive to incoming signals to lock said one relay through which signals are re-transmitted in advance of the re-transmission of a spacing signal and to unlock the same in arrears of a marking signal.

3. In a telegraph repeater interposed between two loop circuits, separate relays for signal reception, bias control and signal re-transmission, there being one of each operable for repeating in one direction, and three corresponding relays for repeating in the opposite direction.

4. A single line telegraph repeater comprising six relays and means to actuate two of said relays successively in response to the operation of a third relay receptive to incoming signals, the remaining three relays being held inoperative until the direction of signal transmission is reversed.

5. A single line telegraph repeater comprising line relays responsive to incoming signals, two bias reversal relays each of which is operable from one of said line relays to render the other said line relay irresponsive to outgoing signals, and re-transmitting relays at least one winding in each of which is in series with one of said bias reversal relays.

6. In a repeater comprising six relays, two of which have line windings and biasing windings, bias-reversal means including two other of said relays and connections with sources of differing or opposite potential so that the breaking of one of said connections by said bias reversal means in response to the operation of one of said line relays will reverse the current flow in the biasing winding of the other said line relay, the remaining two said relays being re-transmitting relays each operable from one of said line relays.

7. In a single line telegraph repeater comprising six relays, means to prevent distortion of the re-transmitted signals comprising a line relay armature with marking and spacing contacts, a bias-control relay releasable when said line relay armature leaves its marking contact and operable upon re-contacting therewith, and a re-transmitting relay operable when said line relay armature leaves its spacing contact and releasable upon re-contacting therewith, the three remaining relays being held inactive until the direction of transmission is reversed.

8. In a single-line telegraph repeater comprising six relays, biasing coils for some of said relays, differentially impressed potentials connected to said coils and means to reverse the current flow through said coils when one of the potential connections is opened.

9. In a single-line telegraph repeater comprising six relays, opposingly impressed exciting potentials connected to some of said relays, means to reverse the exciting force in a receiving relay in accordance with the signals thereby received and means to maintain the exciting force in said relay in one direction when it is included in the circuit for re-transmitted signals.

10. In a single line telegraph repeater comprising six relays two of which are line relays, the method of locking one line relay against operation by retransmitted signals which consists of operating two other relays in succession in one order upon reception by the other line relay of a marking signal and in the reverse order upon reception of a spacing signal.

11. A telegraph repeater comprising a pair of line relays, a line winding and a biasing winding for each of said line relays, a holding relay and a retransmitting relay associated with each of said line relays, the line winding and biasing winding of one line relay being controlled respectively by the retransmitting relay and the holding relay associated with the other line relay, means responsive to the operation of one line relay for simultaneously operating the holding and retransmitting relays associated therewith, and means responsive to the operation of said relays for simultaneously reversing the current in the biasing winding of the other line relay and opening the line winding of the same line relay.

12. A telegraph repeater comprising a pair of line relays, a line winding and a biasing winding for each of said relays, a retransmitting relay and a holding relay associated with each of said line relays, the line winding and biasing winding of one line relay being controlled respectively by the retransmitting relay and the holding relay associated with the other line relay, means responsive to the operation of one line relay by spacing signals for successively operating the holding and retransmitting relays associated therewith in the order named, and means responsive to the successive operation of said relays for reversing the current in the biasing winding of the other line relay before the line winding of that line relay is open.

13. A telegraph repeater comprising a pair of line relays, a line winding and a biasing winding for each of said relays, a holding and a retransmitting relay associated with each of said line relays, said line winding and biasing winding of one line relay being controlled respectively by the retransmitting and the holding relay associated with the other line relay, means responsive to the operation of one line relay by marking signals for successively operating the retransmitting and holding relay associated therewith in the order named, and means responsive to the successive operation of said relays for closing the line winding of the other line relay before the current is reversed in the biasing winding of that line relay.

14. A telegraph repeater comprising two line relays, each having a line winding and a biasing winding, two other relays associated with each of said line relays, means responsive to the operation of one of said line relays for simultaneously operating the two relays associated therewith, and means responsive to the operation of said relays for simultaneously reversing the current in the biasing winding and opening the line winding of the other line relay.

15. A telegraph repeater comprising two line relays each having a line winding and a biasing winding, two other relays associated with each of said line relays, means responsive to the operation of one of said line relays by spacing signals for operating the two other relays associated therewith in a particular order, and means responsive to the operation of said relays in that order for reversing the current in the biasing winding of the other line relay before the line winding of that relay is open.

16. A telegraph repeater comprising two line relays each having a line winding and a biasing winding, two other relays associated with each of said line relays, means responsive to the operation of one of said line relays by marking signals for operating the other two relays associated therewith in an order reverse to that in which they are operated when spacing signals are received, and means responsive to the operation of said relays in that order for closing the line winding of the other line relay before the current in the biasing winding of that relay is reversed.

In witness whereof, I hereunto subscribe my name this 11th day of June, 1930.

GILBERT S. VERNAM.